June 14, 1966  D. R. HUNSAKER  3,256,042
LIFT MECHANISM
Filed July 20, 1964  2 Sheets-Sheet 1

INVENTOR.
DARRELL R. HUNSAKER
BY
ATTORNEYS

June 14, 1966   D. R. HUNSAKER   3,256,042
LIFT MECHANISM
Filed July 20, 1964   2 Sheets-Sheet 2

INVENTOR.
DARRELL R. HUNSAKER
BY
ATTORNEYS

United States Patent Office 3,256,042
Patented June 14, 1966

3,256,042
LIFT MECHANISM
Darrell R. Hunsaker, 4635 Feliciadad Circle,
Anaheim, Calif.
Filed July 20, 1964, Ser. No. 383,678
13 Claims. (Cl. 298—22)

This invention pertains to a lifting device particularly adapted for dumping trailers.

A wide variety of trailers should be dumped in efficient handling of the load carried. These trailers may be adapted to haul agricultural products, refuse, dirt, gravel and many other items. They vary considerably in dimension and load weights extend through a considerable range. Consequently, there is need for a universal trailer dumping device which can adapt a truck to dump whatever trailer may be used. Devices intended to accomplish this purpose have been proposed in the past, but certain difficulties have not been solved satisfactorily. One problem centers around obtaining sufficient lift on the forward end of the trailer to enable the contents to be dumped. This is of particular importance where the trailers are long. Prior devices also have lacked stability and have required the exercise of great care to assure that the truck and trailer are in precise alignment and that off-center loads are not present. If this is not done, the truck and trailer may capsize as the trailer is elevated. Also, correct alignment of the truck and trailer has been required to avoid imparting stresses to the mechanism which may cause failure.

The present invention overcomes these and other difficulties through a unit that includes a frame carried by two sets of arms pivotally connected to the truck frame. These arms extend forwardly from their pivot points to engage the forward portion of the lift frame. A pair of hydraulic cylinders engages the lift frame rearwardly of the connecting points and imparts the motion to the unit to elevate it. The fifth wheel is carried by the frame at the aft end and, by this mechanism, is lifted nearly vertically and directly over the truck axle. Preferably, a second cylinder is connected to the fifth wheel to provide further elevation after the lift frame has been elevated. Ball-and-socket joints mount the cylinders so that side forces will have no adverse effect. The fifth wheel mounting permits universal movement when the mechanism is in the lowered position, which causes the fifth wheel to assume a proper angle with respect to the trailer even if the trailer is not aligned with the truck. Upon elevation, however, the mounting allows only limited movement and a stable support. Safety support pads are automatically lower to a position just above the ground on either side of the truck frame when the mechanism is raised, providing direct stabilization in the event the load should tip.

This design allows an exceptionally high lift of the heaviest loads with complete stability, regardless of the angle between the truck and the trailer. The unit is durable and easy to maintain. It is quite compact when in the retracted position and readily adapted to fit on almost any truck frame.

An object of this invention is to provide an improved lift mechanism for dumping trailers.

Another object of this invention is to provide a lift mechanism capable of great elevation in height.

A further object of this invention is to provide a lift device offering stability and permitting misalignment between the truck and the trailer.

An additional object of this invention is to provide a lift device of universal applicability, relatively simple construction and adaptability to almost any truck frame.

Yet another object of this invention is to provide a lift device that avoids complexity and is of relatively low cost to manufacture and maintain.

These and other objects will become apparent from the following detailed description taken in connection with the accompanying drawing in which.

Figure 1:
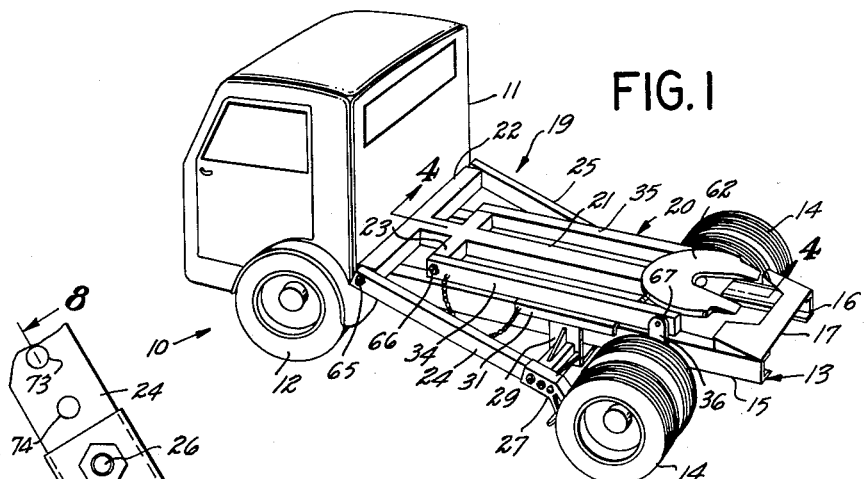
FIGURE 1 is a perspective view of the arrangement of this invention as attached to a truck frame, with the device being in the retracted position.
Figure 2:
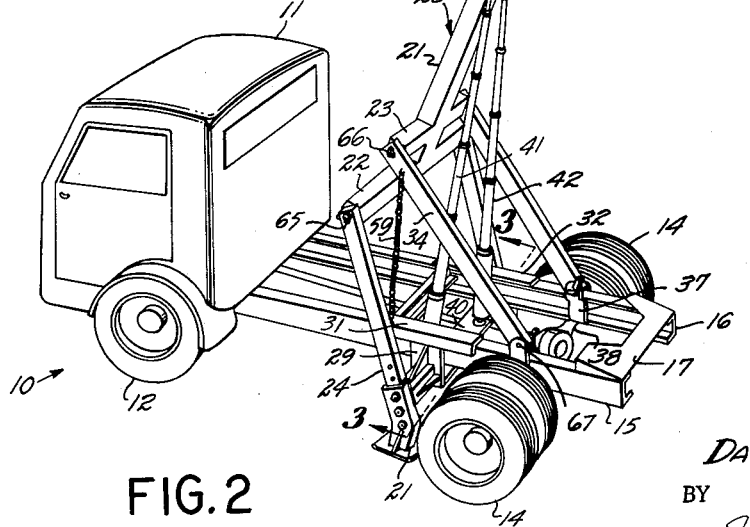
FIGURE 2 is a view similar to FIGURE 1 but with the mechanism elevated.

With reference to the drawing, there may be seen in FIGURES 1 and 2 a truck 10 having a cab 11 adjacent the front wheels 12, and a frame 13 supported by the rear wheels 14. The truck frame 13 includes parallel channels 15 and 16 interconnected by a plate 17 at their ends rearward of the truck wheels 14. The lifting device 19 of this invention is attached to the truck frame 13 in back of the cab 11.

Figure 3:
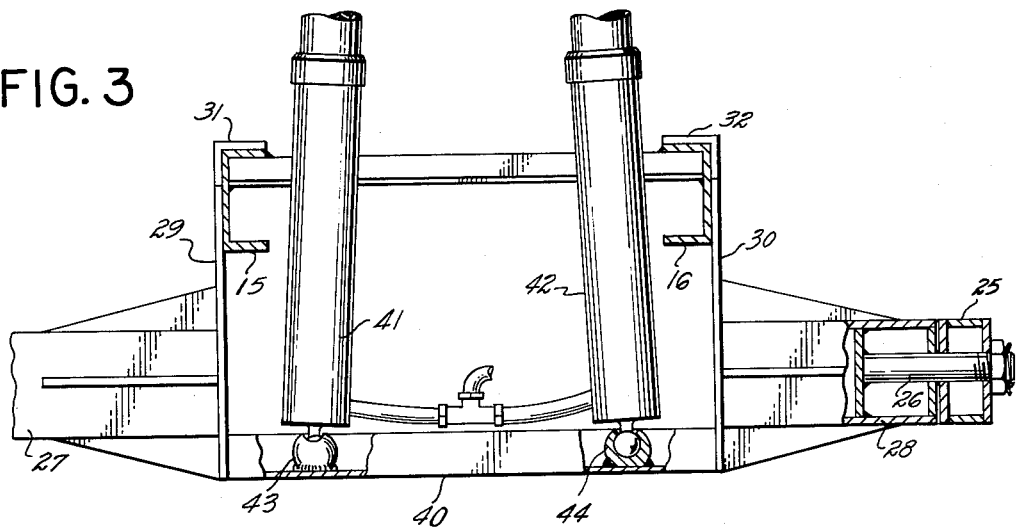
FIGURE 3 is a transverse sectional view taken along line 3—3 of FIGURE 2, showing the mounting arrangement of the cylinders.

The lifting device 19 of this invention includes a lift frame 20 that has a central mast 21, at the forward end of which is a transverse beam 22, spaced inwardly of which is a second transverse beam 23. The latter member is shorter than the beam 22. In the retracted position of FIGURE 1, the lift frame 20 lies on top of the truck frame 13 with the transverse member 22 at the forward end adjacent the cab 11. Parallel arms 24 and 25 pivotally connect to the outer ends of the transverse beam 22 and incline downwardly and rearwardly from it. The other ends of the arms 24 and 25 pivotally connect to transverse support members 27 and 28 that extend outwardly ahead of the rear wheels 14 of the truck. The connection of the arm 25 to pin 26, carried by support member 28, is shown in detail in FIGURE 3. The structural members 27 and 28 are carried by depending webs 29 and 30, which, in turn, connect to angles 31 and 32. These angles overlap the outer corners of the truck frame channels 15 and 16 and are secured to the truck frame.

An additional pair of arms 34 and 35 pivotally connects to the ends of the second transverse beam 23. The rearward ends of the arms 34 and 35 pivotally connect to brackets 36 and 37 that are secured to the truck frame generally above the rear axle 38. When the mechanism is retracted, the arms 34 and 35 are in the horizontal position on top of the channels 15 and 16.

A transverse support beam 40 interconnects the webs 29 and 30, extending beneath the truck frame channels 15 and 16. The beam 40 supports the lower ends of multiple hydraulic power cylinders 41 and 42. These cylinders are connected to the beam 40 by ball-and-socket joints 43 and 44. The outer ends of the cylinders 41 and 42 connect to the mast 21 near its rearward end. Similar ball-and-socket joints are used for the connections to the mast, the joint 45 for cylinder 41 being seen in FIGURES 1 and 2. With the unit retracted, therefore, the power cylinders 41 and 42 incline upwardly and to the rear to engage the lift frame 20. The upper ends of the cylinders converge as the bottom ball-and-socket joints 43 and 44 are spaced outwardly of the connections to the mast 21.

Figure 4:
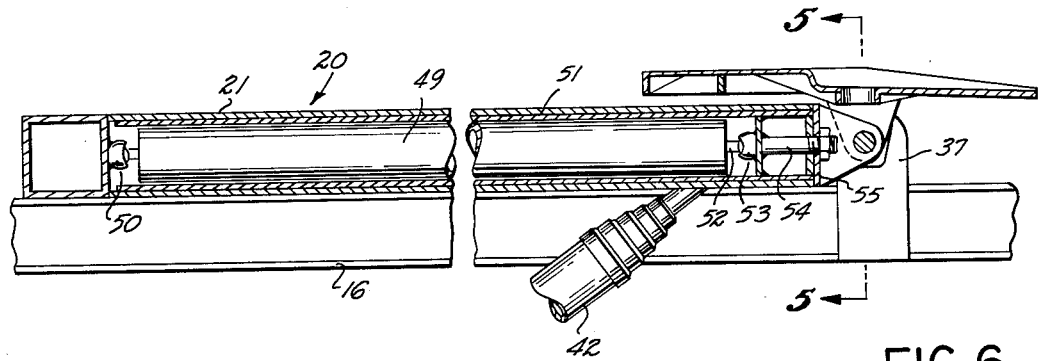
FIGURE 4 is a longitudinal sectional view taken along line 4—4 of FIGURE 1, showing the arrangement of the third extension cylinder and the mounting of the fifth wheel.
Figure 5:
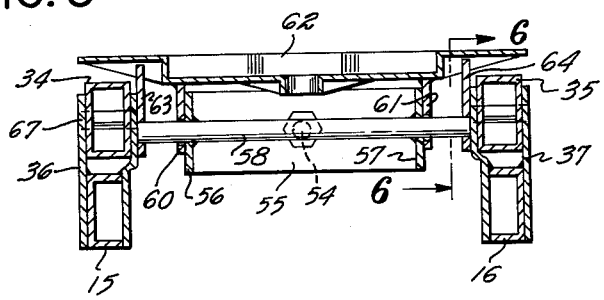
FIGURE 5 is a sectional view taken along line 5—5 of FIGURE 4.
Figure 6:
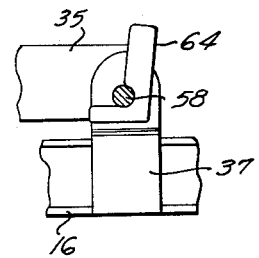
FIGURE 6 is a fragmentary sectional view taken along line 6—6 of FIGURE 5, showing how the fifth wheel is supported when the mechanism is retracted.

As best seen in FIGURE 4, a third power cylinder 49 is carried within the mast 21, the latter element being constructed as a hollow box beam. The cylinder 49 is a double acting cylinder secured by a ball-and-socket joint 50 to the frame 20 adjacent the transverse beam 23. The cylinder 49 fits within a second square box beam 51, which is slidable relative to the mast 21 and the cylinder 49 as well. The piston rod 52 of the cylinder 49 connects through a ball-and-socket joint 53 to a short longitudinal shaft 54 which is secured to the outer end of the slidable box beam 51. The opposite end of the shaft 54 extends through a transverse plate 55, which is thereby rotatable about the axis of the shaft 54 relative to the mast 21.

Brackets 56 and 57 are carried by the opposite ends of the plate 55, and through these brackets extends a transverse shaft 58. This shaft has its axis perpendicular to the axis of the shaft 54.

Outwardly of the brackets 56 and 57 the shaft 58 extends through an additional pair of brackets 60 and 61. These members depend from the fifth wheel 62 to which they are attached. A trailer can be secured to the fifth wheel 62 in the usual manner. The fifth wheel by this construction is made rotatable about the axis of the cross shaft 58.

At the outer ends of the shaft 58 are support members 63 and 64, recessed to hold the shaft 58 when the mechanism is in its lowered position. Hence, when the unit is retracted, there can be no rotation of the plate 55 about the axis of the shaft 54. Also, the support members 63 and 64 hold the fifth wheel against the outward pull of the trailer attached to it, so that the fifth wheel will not move in response to such a load upon it. Even if the supports 63 and 64 were disengaged, the cylinder 49 would resist the pull of the trailer on the fifth wheel 62. As a consequence of the engagement of the shaft 58 with the supports 63 and 64, the fifth wheel 62 is limited to rotation about the transverse axis of the shaft 58. It can be seen, therefore, that with the mechanism retracted the fifth wheel will serve in the conventional manner for towing the trailer that is hitched to it.

To elevate the mechanism, the cylinders 41 and 42 first are extended as indicated in FIGURE 2. This causes the arms 24 and 25, as well as the arms 34 and 35, to pivot upwardly about their connections to the fixed support elements. They are caused to rotate clockwise as the unit is viewed in FIGURES 1 and 2. At the same time, the lift frame 20 is rotated in a counterclockwise direction so that its aft end where the fifth wheel is located is moved upwardly. The total movement of the mechanism is limited by a chain 59 extending between the two pairs of arms, or some other suitable stop may be provided.

The kinematics of this construction are such that the fifth wheel moves almost vertically as the linkage is elevated in this manner. The loads are absorbed through the linkage primarily at the bottom ends of the cylinders 41 and 42 where they connect to the transverse beam 40. This places the principal load support immediately forward of the axle 38, at a location beneath the truck frame 13 and quite close to the ground, taken out through the ball joints 43 and 44 which are spaced on either side of the longitudinal axis. Great stability results from this arrangement.

After the linkage has been raised in this manner, the third cylinder 49 also is extended. This causes the inner beam 51 to move beyond the upper end of the mast 21. This provides further elevation of the fifth wheel 62.

This unit has several advantages resulting from the construction described above. First, it provides an amount of lift, providing enough elevation to dump even the longest trailers despite the fact that the unit is very compact when retracted and fits on a short wheel base truck. The load is maintained adjacent the rear axle, where it can be properly supported as the nearly vertical movement is obtained. The upwardly and inwardly convergent power cylinders offer stability, directing the load outboard as it is transmitted to the support assembly. The ball-and-socket mountings for the ends of the power cylinders greatly increase their life because any side forces on the cylinders will not tend to break the seals or otherwise harm the cylinders. This also avoids imposition of twisting forces on the lift mechanism and the truck frame.

A further advantage resides in the mounting of the fifth wheel. When the fifth wheel initially is raised above the side supports 63 and 64, it then can rotate about the horizontal axis of the shaft 54. This is by virtue of the connection through the transverse plate 55. This means that, as the lifting of the trailer commences, the fifth wheel has freedom for universal movement, being rotatable about both shafts 54 and 58. Consequently, even though the trailer is offset from the truck and not in alignment with it, the fifth wheel can assume a position so that no side stresses will be imparted to it as the lifting takes place. The fifth wheel, therefore, automatically will assume the proper attitude with respect to the trailer.

When the fifth wheel is in the raised position, such as illustrated in FIGURE 2, the axis of shaft 54 shifts from its initial horizontal position to a substantially vertical alignment. As the linkage approaches the limit of its elevation, the fifth wheel 62 can rotate in substantially a horizontal plane because of the vertical positioning of the shaft 54. Also, it can pivot about the horizontal axis of the second shaft 58. Hence, the ability to correct for misalignment of the truck and trailer continues as the fifth wheel is elevated.

However, there is a stability offered when the linkage is raised resulting from the use of the two shafts 54 and 58 arranged with their axes normal. There can be no lateral tipping when the linkage is elevated. With the axis of the shaft 54 nearly vertical, that shaft prevents the transverse plate 55 from rotating either to the left or to the right. This, in turn, prevents the fifth wheel 62 from tipping to either side.

Consequently, the fifth wheel mounting arrangement stabilizes the fifth wheel against undesirable side rotation when the forward end of the trailer is raised. However, the necessary rotation to accommodate for misalignment of the truck and trailer can still take place.

Normally it is preferred to achieve as close to a directly vertical path of movement of the fifth wheel 62 as possible. This maintains the loads adjacent the rear axle of the truck and contributes to the stability of the unit. Such movement is obtained when the spacing between the pivot points 65 and 66 lengthwise of the mast 21 where the two pairs of arms connect is equal to the vertical spacing between the pivot points 67 and 26 at the rearward ends of the pairs of arms. Upon occasion, particular loads may means that forward or rearward movement of the fifth wheel, as well as the vertical lift, is desirable. In that event, the spacing of the pivot points can be changed and the special movement obtained.

Figure 7:
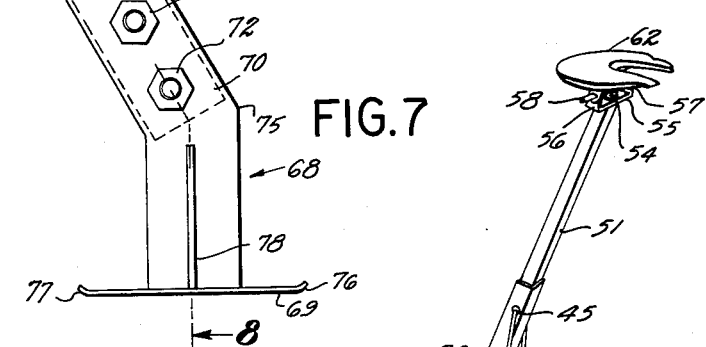
FIGURE 7 is an enlarged fragmentary side elevational view of one of the support elements at the bottom of the unit, with the mechanism in its elevated position.
Figure 8:
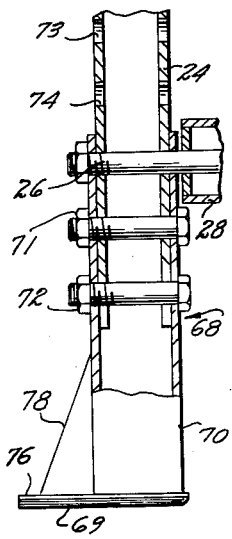
FIGURE 8 is a sectional view, partially in elevation, taken along line 8—8 of FIGURE 7.

In order to assure complete safety even under the most difficult conditions, preferably there are extensions 68 on the arms 24 and 25. These extensions, best illustrated in FIGURES 7 and 8, project past the connections to the supports 27 and 28, terminating in flat plates 69 at their outer ends. Each of the extensions 68 includes a box beam portion 70 that slidably fits over the lower portion of the arm with which it is associated. Arm 24 is shown in FIGURES 7 and 8, the arrangement for arm 25 being similar. Bolts 71 and 72 extend through the upper end of beam 70 and the lower end of the arm 24 to make the attachment. Additonal bolt holes 73 and 74 are provided in arm 24 to permit the vertical postion of the extension 68 to be adjusted. It may be slid onto the arm 24 a distance sufficient to allow the bottom plate 69 to just clear the surface beneath the truck when the linkage is elevated. Usually, around 1½ inches clearance is provided. There is a bend 75 in the beam 70 so that its lower portion is vertical when the lift mechanism is in the fully elevated position.

The plate 69 has rounded forward and rearward edges 76 and 77, and extends laterally outwardly from the beam 70. A web 78 provides reinforcement for the outer edge of the plate 69.

By this construction there is automatically provided a bottom emergency support as the mechanism is elevated. The plates 69 provide widely spaced members located just above the supporting surface beneath the truck. In the event of any tipping of the load on the fifth wheel, one of the plates 69 immediately will be brought into contact with the ground. This will stabilize the unit, preventing any further tipping. The load is transmitted from the truck chassis directly to the ground by this arrangement, giving further assurance that the trailer and truck will not capsize. The plates 68 automatically retract to assume a position just forward of the wheels 14 as the linkage is lowered.

The foregoing detailed description is to be clearly understood as given by way of illustration and example only, the spirit and scope of this invention being limited solely by the appended claims.

I claim:

1. A trailer towing and dumping arrangement comprising
a framework adapted for attachment to a truck frame, and a fifth wheel carried by said framework,
said framework being movable between
a first position in which said fifth wheel is retracted
and a second position in which said fifth wheel is elevated for thereby dumping a trailer attached thereto,
said framework including at least two pivotal members,
and means pivotally mounting said members on opposite sides of said framework,
said pivotal members including extensions beyond said pivotal mounting means,
said extensions being dimensioned to extend downwardly to a position adjacent a supporting surface beneath said framework when said framework is in said second position for thereby providing a safety arrangement to preclude tipping of a load attached to said fifth wheel.

2. A lifting device for trailers or the like comprising
a first elongated member,
a trailer-connecting member adjacent one end of said first elongated member,
a first arm means pivotally connected to the opposite end of said first member,
a second arm means pivotally connected to said first member inwardly of said opposite end,
a first fixed member pivotally connected to the opposite end of said first arm means,
a second fixed member pivotally connected to the opposite end of said second arm means,
said fixed members being adapted for attachment to a truck frame,
and means engaging said first member for lifting upwardly on said one end thereof for thereby raising said trailer-connecting member.

3. A device as recited in claim 2 in which
said first arm means includes laterally spaced support means
movable downwardly by said first arm means to a position adjacent a surface beneath said device for providing a safety support to preclude tipping of said trailer-connecting member.

4. A lifting device for trailers or the like comprising
an elongated member,
a fifth wheel,
means connecting said fifth wheel to said elongated member adjacent one end of said elongated member,
a first pair of arms,
means pivotally connecting one end of said first pair of arms to said elongated member adjacent the opposite end of said elongated member,
a second pair of arms,
means pivotally connecting one end of said second pair of arms to said elongated member adjacent said one end of said first pair of arms and inwardly thereof with respect to said elongated member,
a first fixed member,
a second fixed member,
said fixed members being adapted for connection to a truck frame,
means pivotally connecting the opposite end of said first pair of arms to said first fixed member,
means pivotally connecting the opposite end of said second pair of arms to said second fixed member,
power cylinder means,
and means providing a support for one end of said power cylinder means,
the opposite end of said power cylinder means being connected to said elongated member adjacent said one end thereof for lifting upwardly on said one end of said elongated member and simultaneously pivoting said pairs of arms upwardly.

5. A device as recited in claim 4 in which said means connecting said elongated member includes
means for permiting rotation about an axis aligned with said elongated member,
and means for permitting rotation about an axis perpendicular to said elongated member.

6. A lifting device for trailers and the like comprising
an elongated member,
a fifth wheel,
means pivotally connecting said fifth wheel to one end of said elongated member,
a first pair of arms,
means pivotally connecting said first pair of arms to the opposite end of said elongated member with said arms disposed one on either side of said elongated member,
a second pair of arms,
means pivotally connecting one end of said second pair of arms to said elongated member adjacent said opposite end and inwardly thereof with said second pair of arms positioned with one arm on either side of said elongated member,
a first fixed support,
means pivotally connecting the opposite end of said first pair of arms to said first fixed support,
a second fixed support,
means pivotally connecting the opposite end of said second pair of arms to said second fixed support,
said first fixed support being below said second fixed support and relatively closer to said opposite end of said elongated member than said second fixed support,
and power cylinder means for lifting said one end of said elongated member upwardly for elevating said fifth wheel at said one end of said elongated member.

7. A device as recited in claim 6 including in addition
a second power cylinder means interposed between said fifth wheel and said elongated member for elevating said fifth wheel beyond said one end of said elongated member.

8. A device as recited in claim 6 in which
said power cylinder means includes a pair of power cylinders,
means supporting one end of said pair of power cylinders adjacent said first fixed support,
and means pivotally connecting said opposite end of said pair of power cylinders adjacent said one end of said elongated member with said power cylinders being disposed one on either side of said elongated member and converging from said first fixed support toward said elongated member.

9. A device as recited in claim 8 in which
said means pivotally connecting said power cylinders to said first fixed support and to said elongated member includes ball-and-socket joints at said locations.

10. A trailer towing and dumping arrangement comprising
an elongated member,
a first transverse beam at one end of said elongated member and extending outwardly on either side thereof,
a second transverse beam inwardly of said first transverse beam and extending outwardly on either side of said elongated member,
a first pair of arms pivotally connected to said first transverse beam with one arm on either side of said elongated member,
a second pair of arms pivotally connected to said second transverse beam with one arm on either side of said elongated member,
means pivotally mounting the opposite ends of said pair of arms with said first pair of arms being pivotally supported at said opposite end thereof beneath the pivotal connection of said second pair of arms and relatively closer longitudinally to said transverse beams,
a first power cylinder means,
means supporting said first power cylinder means adjacent said opposite end of said first pair of arms,
the opposite end of said first power cylinder means being connected to said elongated member adjacent said opposite end of said elongated member, whereby upon extension of said power cylinder means said opposite end of said elongated member is raised and said pairs of arms are pivoted upwardly,
a second power cylinder means carried by said elongated member,
and a fifth wheel carried by said second power cylinder means,
whereby upon extension of said second power cylinder means said fifth wheel is extensible to an elevated position beyond said opposite end of said elongated member.

11. A device as recited in claim 10 in which for connecting said fifth wheel to said second power cylinder means there is
a first rotatable member having its axis of rotation substantially aligned with the longitudinal dimension of said elongated member,
and a second rotatable member connected to said fifth wheel,
said second rotatable member having its axis of rotation substantially perpendicular to said axis of rotation of said first rotatable member,
and including in addition means for precluding rotation of said fifth wheel about said axis of said first rotatable member when said fifth wheel is retracted and in a lowered position.

12. A device as recited in claim 11 in which said second power cylinder means includes
a beam,
a hydraulic cylinder inside of said beam and slidable relative thereto,
a piston rod extending from one end of said hydraulic cylinder and connected to said beam for causing longitudinal movement of said beam,
means connecting the opposite end of said power cylinder to said elongated member,
said beam and said hydraulic cylinder being received within said elongated member with said beam being slidable relative to said elongated member and guided thereby,
whereby upon extension of said piston rod said beam slides outwardly with respect to said elongated member for thereby elevating said fifth wheel.

13. A device as recited in claim 10 in which said first pair of arms includes extensions beyond said pivotal mountings thereof, said extensions being movable upon said upward rotation of said first pair of arms to a position adjacent a supporting surface beneath said mechanism for providing a safety support in the event of tipping of said mechanism.

References Cited by the Examiner
UNITED STATES PATENTS 2,522,385 9/1950 Lindsay.
2,710,224 6/1955 Howath _____ 298—22
2,953,410 9/1960 Chaney _____ 298—20 X BENJAMIN HERSH, *Primary Examiner.*

R. J. JOHNSON, *Assistant Examiner.*